(12) United States Patent
Carroll (10) Patent No.: US 12,310,347 B2
(45) Date of Patent: May 27, 2025

(54) OPEN-DESIGN HORSE BOOT

(71) Applicant: Andrew G. Carroll, Sandusky, OH (US)

(72) Inventor: Andrew G. Carroll, Sandusky, OH (US)

(*) Notice: Subject to any disclaimer, the term of this patent is extended or adjusted under 35 U.S.C. 154(b) by 8 days.

(21) Appl. No.: 18/466,332

(22) Filed: Sep. 13, 2023

(65) Prior Publication Data

US 2024/0090488 A1    Mar. 21, 2024

Related U.S. Application Data

(60) Provisional application No. 63/485,967, filed on Feb. 20, 2023, provisional application No. 63/407,818, filed on Sep. 19, 2022.

(51) Int. Cl.
*A01L 7/00* (2006.01)
*A01L 7/02* (2006.01)

(52) U.S. Cl.
CPC ..................... *A01L 7/02* (2013.01)

(58) Field of Classification Search
CPC ..................... A01L 5/00; A01L 7/00
See application file for complete search history.

(56) References Cited

U.S. PATENT DOCUMENTS

| | | |
|---|---|---|
| 72,594 A | 12/1867 | Bishop |
| 4,290,487 A | 9/1981 | Unger |
| 4,470,411 A | 9/1984 | Hoyt, Jr. |
| D290,415 S | 6/1987 | Hoyt, Jr. |
| 4,981,010 A | 1/1991 | Orza |
| 5,152,285 A | 10/1992 | Gnegy |
| D352,369 S | 11/1994 | Figoni |
| 5,363,632 A | 11/1994 | Armato |
| 6,062,008 A * | 5/2000 | Nor .................. A01L 15/00 54/82 |
| D440,363 S | 4/2001 | Ford |
| 6,644,000 B2 | 11/2003 | Clark et al. |
| 6,662,537 B1 | 12/2003 | Wilson |
| 6,694,713 B1 | 2/2004 | MacDonald |
| 7,174,858 B2 | 2/2007 | Ford |

(Continued)

FOREIGN PATENT DOCUMENTS

| | | |
|---|---|---|
| GB | 2501916 A | 11/2013 |
| IT | 20180004140 A1 | 9/2019 |
| WO | 8400094 A1 | 1/1984 |

OTHER PUBLICATIONS

Extended European Search Report from European Patent Application 23198318.0, Date of completion of search: Feb. 1, 2024, Search mailed Feb. 12, 2024, 9 pages.

*Primary Examiner* — Joshua J Michener
*Assistant Examiner* — Henry Hooper Mudd
(74) *Attorney, Agent, or Firm* — Tucker Ellis LLP (57) ABSTRACT

A horse boot removably securable to a horse hoof, the horse boot including a sole having opposite first and second engagement surfaces. Said first engagement surface being configured to face the horse hoof when the horse boot is in an installed position, and the second engagement surface being configured to face and contact a ground surface. A plate is embedded within the sole between the first and second engagement surfaces. The sole is horseshoe shaped and has an open-central area configured to permit a bottom of the horse hoof to remain open to airflow.

5 Claims, 10 Drawing Sheets

(56) References Cited

U.S. PATENT DOCUMENTS

| | | |
|---|---|---|
| D553,806 S | 10/2007 | Giles |
| D565,256 S | 3/2008 | Ruetenik |
| 7,434,378 B2 | 10/2008 | Wilson |
| 7,445,051 B2 | 11/2008 | Ruetenik |
| 7,461,497 B2 | 12/2008 | Ford |
| 7,490,458 B2 | 2/2009 | Ford |
| 7,493,963 B2 | 2/2009 | Ford |
| 7,578,115 B2 | 8/2009 | Ford |
| D616,614 S | 5/2010 | Ruetenik |
| 7,736,718 B2 | 6/2010 | Wilson |
| D629,977 S | 12/2010 | Ford |
| D634,902 S | 3/2011 | Donnelly |
| D652,178 S | 1/2012 | Ford |
| 8,151,545 B1 | 4/2012 | Ford |
| 8,151,546 B2 | 4/2012 | Ford |
| 8,186,447 B2 * | 5/2012 | Osborne .............. A01L 3/02 168/20 |
| 8,196,378 B2 | 6/2012 | Ford |
| 8,220,231 B2 | 7/2012 | Ruetenik |
| 8,291,683 B2 | 10/2012 | Ruetenik |
| D671,693 S | 11/2012 | Ford |
| D671,694 S | 11/2012 | Ford |
| 8,413,412 B2 | 4/2013 | Ford |
| 8,443,763 B2 | 5/2013 | Heid |
| 8,584,624 B2 | 11/2013 | Heid |
| D709,656 S | 7/2014 | Ruetenik |
| 8,931,244 B2 | 1/2015 | Gola |
| D728,867 S | 5/2015 | Ruetenik |
| 9,055,732 B1 | 6/2015 | Ruetenik |
| 9,089,107 B2 | 7/2015 | Munoz |
| D743,637 S | 11/2015 | Ruetenik |
| D746,519 S | 12/2015 | Ruetenik |
| 9,351,477 B2 | 5/2016 | Caswell |
| 9,402,382 B2 | 8/2016 | Burr |
| 9,770,018 B2 | 9/2017 | Ruetenik |
| 10,021,868 B2 | 7/2018 | Edwards |
| D831,900 S | 10/2018 | Ruetenik |
| D831,901 S | 10/2018 | Ruetenik |
| D831,902 S | 10/2018 | Ruetenik |
| D831,903 S | 10/2018 | Ruetenik |
| D838,059 S | 1/2019 | Ruetenik |
| D839,495 S | 1/2019 | Mauro |
| 10,292,378 B2 | 5/2019 | Ruetenik |
| 10,925,273 B2 | 2/2021 | MacDonald |
| 11,000,011 B2 | 5/2021 | Coder |
| 2004/0134169 A1 | 7/2004 | Persson |
| 2004/0168813 A1 | 9/2004 | Ford |
| 2005/0066632 A1 | 3/2005 | Ford |
| 2005/0150197 A1 | 7/2005 | Ford |
| 2005/0166556 A1 | 8/2005 | Ford |
| 2006/0064950 A1 | 3/2006 | Ford |
| 2007/0039289 A1 | 2/2007 | LeCompte |
| 2007/0107389 A1 | 5/2007 | Ruetenik |
| 2008/0078562 A1 * | 4/2008 | Kirkpatrick .............. A01L 7/02 168/14 |
| 2008/0083198 A1 | 4/2008 | Wilson |
| 2008/0083542 A1 | 4/2008 | Ford |
| 2008/0264005 A1 * | 10/2008 | Ford .................. B68C 5/00 54/82 |
| 2009/0032270 A1 | 2/2009 | Ruetenik |
| 2009/0061162 A1 | 3/2009 | Wilson |
| 2009/0071109 A1 | 3/2009 | Ford |
| 2009/0094949 A1 | 4/2009 | Heid |
| 2009/0100808 A1 | 4/2009 | Ford |
| 2009/0235621 A1 | 9/2009 | Ford |
| 2009/0288377 A1 | 11/2009 | Heid |
| 2010/0083624 A1 | 4/2010 | Ford |
| 2010/0229508 A1 | 9/2010 | Gola |
| 2011/0067366 A1 | 3/2011 | Ruetenik |
| 2011/0197554 A1 | 8/2011 | Ruetenik |
| 2011/0219732 A1 | 9/2011 | Finnegan |
| 2012/0083725 A1 | 4/2012 | Mattes |
| 2012/0227364 A1 | 9/2012 | Ford |
| 2013/0019575 A1 | 1/2013 | Bartlett |
| 2014/0116733 A1 | 5/2014 | Finnegan |
| 2014/0231101 A1 | 8/2014 | Ford |
| 2014/0262353 A1 * | 9/2014 | Bergeleen .............. A01L 3/00 |
| 2014/0305085 A1 | 10/2014 | Munoz |
| 2014/0325944 A1 | 11/2014 | Ruetenik |
| 2015/0047303 A1 | 2/2015 | Caswell |
| 2015/0101833 A1 | 4/2015 | Ford |
| 2015/0119772 A1 | 4/2015 | Ruetenik |
| 2015/0156989 A1 | 6/2015 | Ruetenik |
| 2015/0164059 A1 | 6/2015 | Bartlett |
| 2016/0029609 A1 | 2/2016 | MacDonald |
| 2016/0249597 A1 | 9/2016 | Ruetenik |
| 2016/0324119 A1 | 11/2016 | Mills |
| 2017/0027132 A1 | 2/2017 | Coder |
| 2017/0099825 A1 | 4/2017 | Ruetenik |
| 2017/0172134 A1 | 6/2017 | Ruetenik |
| 2017/0231194 A1 | 8/2017 | Coder |
| 2017/0280682 A1 | 10/2017 | Ruetenik |
| 2017/0360541 A1 | 12/2017 | Orr |
| 2018/0042210 A1 | 2/2018 | Edwards |
| 2019/0364848 A1 * | 12/2019 | Ford ................ A01K 13/00 13/7 |
| 2020/0178502 A1 | 6/2020 | MacDonald |
| 2020/0383763 A1 | 12/2020 | Ludovice |
| 2021/0127656 A1 | 5/2021 | MacDonald |
| 2021/0275350 A1 | 9/2021 | Orr |
| 2021/0289764 A1 | 9/2021 | MacDonald |
| 2022/0217961 A1 * | 7/2022 | Ingraham ............. A01L 5/00 |
| 2023/0122576 A1 * | 4/2023 | Ingraham ............. A01L 5/00 |

* cited by examiner

OPEN-DESIGN HORSE BOOT

FIELD OF THE INVENTION

This application relates generally to a horse boot, and more particularly, a horse boot configured to provide stability and traction to a horse hoof while maintaining a generally natural environment of the hoof.

BACKGROUND OF THE INVENTION

Many horses wear metal shoes (i.e., horseshoes) to assist with comfort and durability of their hooves. Horses that wear horseshoes are referred to as being shod. Some horses are shod on their front and go barefoot on their hind hooves. Others are shod on all four hooves. Horseshoes come in many varied sizes and profiles. These horseshoes are typically fastened to the horse's hoof using nails. The application and removal of a shoe is a task that generally requires a farrier; a person trained and in the business of trimming horse hooves and shoeing them as necessary.

Metal horseshoes are effective at protecting horses and providing them with stability in dirt, grass, and gravel conditions. However, the horseshoes are a liability in wet conditions, especially when on asphalt, concrete, or other synthetic (man-made) environments. This is because metal horseshoes slip much more easily than a horse's natural hoof. As such, horses tend to slip very easily when you combine metal horseshoes with wet conditions on synthetic surfaces. Such slipping events can cause injury to the horses themselves and/or others (e.g., rider, trainer, owner, etc.).

Conventional horse boots generally do not accommodate a horse wearing a horseshoe. More specifically, such conventional horse boots are fully enclosed 360° around all the sides of the hoof and have fully enclosed bottoms. Many conventional designs are used for medicinal purposes by having fully enclosed designs meant to keep medicine in and elements out, while being worn by an injured horse.

BRIEF SUMMARY OF THE INVENTION

In accordance with one aspect, there is provided a horse boot configured to be removably secured to a horse hoof. The horse boot comprises a sole having opposite first and second engagement surfaces. The first engagement surface is configured to face the horse hoof when the horse boot is in an installed position and the second engagement surface is configured to face and contact a ground surface when the horse boot is in an installed position. The horse boot further comprises a plate embedded within the sole between said first and second engagement surfaces. The sole is horseshoe shaped and has an open-central area configured to permit a bottom of the horse hoof to remain open to airflow.

In one embodiment, the plate is metal and the sole is rubber.

In one embodiment, the plate is horseshoe shaped and includes an aperture formed therein. A portion of the sole resides within the aperture.

In one embodiment, the horse boot further comprises an upper secured to the sole. The upper is configured to removably secure the horse boot to the horse hoof.

In one embodiment, the upper has an opened backing configured to permit a rear of a horseshoe secured to the horse hoof to extend outside of the horse boot.

In one embodiment, the upper comprises a body following a contour of a rim projecting outwards from the first engagement surface and disposed at a front portion of the horse boot. Further, the upper comprises first and second straps projecting from the body. Each of the first and second straps is configured to extend helically upwards to wrap around a rear of the horse hoof.

In one embodiment, the rim has opposite internal and external surfaces, and the body has opposite internal and external faces. The external face of the body faces and physically contacts the internal surface of the rim. Further, the internal face of the body is configured to face the horse hoof.

In one embodiment, the body is attached to the rim in order to secure the upper to the sole.

In one embodiment, each of the first and second straps is spaced from the first engagement surface of the sole.

In one embodiment, each of the first and second straps extends outwards from the body at a respective joint and terminates at a respective band. The respective bands of the first and second straps are configured to be attachable to one another at a front of the horse hoof.

In one embodiment, the respective joints of the first and second straps are spaced from the first engagement surface of the sole.

In one embodiment, the plate is embedded within the sole such that the plate is fully encapsulated within the sole.

In one embodiment, the sole has an inner peripheral surface that defines the open-central area thereof. Further, the sole has a protrusion extending outwards from the inner peripheral surface and projecting above the first engagement surface.

In one embodiment, the sole further includes a rim projecting outwards from the first engagement surface and disposed at a front portion thereof. The rim is provided at a spaced distance from the protrusion. The spaced distance is configured to accommodate therein a horseshoe secured to the horse hoof.

In accordance with another aspect, there is provided a horse boot configured to be removably secured to a horse hoof having a horseshoe secured thereto. The horse boot comprises a rubber sole being horseshoe shaped. The rubber sole has opposite first and second engagement surfaces, wherein said first engagement surface is configured to face and contact the horseshoe when the horse boot is in an installed position, and wherein said second engagement surface is configured to face and contact a ground surface when the horse boot is in the installed position. The rubber sole comprises a rim projecting outwards from the first engagement surface at a front portion of the horse boot and following a contour of an outer peripheral surface of the rubber sole. The rubber sole further comprises a pair of projections. Each projection of the pair of projections extends outwards from an inner peripheral surface of the rubber sole. The pair of projections are spaced from one another and are provided at respective spaced distances from respective sections of the rim. Each of the respective spaced distances is configured to accommodate therein respective portions of the horseshoe. Further the inner peripheral surface of the rubber sole defines an open-central area of the rubber sole that is configured to permit a bottom of the horse hoof to remain open to airflow.

The horse boot further comprises a horseshoe shaped metal plate embedded within the rubber sole between the first and second engagement surfaces. The metal plate is fully encapsulated within said rubber sole, and the metal plate has an aperture formed therein that accommodates a portion of the rubber sole. The horse boot also comprises an upper having an opened backing configured to permit a rear of the horseshoe to extend outside of the horse boot. The upper comprises a body following a contour of the rim. The body physically contacts and is secured to an inner surface of the rim. The upper also comprises first and second straps projecting from the body. Each of the first and second straps is configured to extend helically upwards to wrap around a rear of the horse hoof. Further, each of the first and second straps is spaced from the first engagement surface of the rubber sole. Also, each of the first and second straps extends outwards from the body and terminates at a respective band, wherein the respective bands of the first and second straps are configured to be attachable to one another at a front of the horse hoof.

In accordance with a further aspect, a method of removably installing a horse boot comprises the steps of providing a horse having a horseshoe attached to a hoof thereof, and providing a horse boot. The horse boot comprises a sole having opposite first and second engagement surfaces, and a plate embedded within said sole between said first and second engagement surfaces. The sole is horseshoe shaped and has an open-central area configured to permit a bottom of the hoof to remain open to airflow. The method further includes the steps of placing the horse boot adjacent the hoof such that the first engagement surface of the sole contacts the horseshoe, and attaching the horse boot to the horseshoe via a first fastener.

In one embodiment, the step of attaching the horse boot to the horseshoe comprises passing a first end of the first fastener through the sole and the plate and securing the first end of the first fastener within a threaded hole formed in the horseshoe via a threaded engagement.

In one embodiment, the horse boot further comprises a cutout formed in the second engagement surface of the sole. When the horse boot is attached to the horseshoe, a second end of the first fastener, opposite to the first end, is disposed within the cutout such that the first fastener does not extend beyond the second engagement surface of the sole.

In one embodiment, the cutout exposes a portion of a surface of the plate. The first fastener comprises a head provided at the second end thereof. The head physically contacts the surface of the plate when the horse boot is attached to the horseshoe.

In one embodiment, the method further comprises the steps of removing said first end of the first fastener from said threaded hole, separating the first engagement surface of the sole from the horseshoe, providing a second fastener, and securing said second fastener within the threaded hole.

DESCRIPTION OF EXAMPLE EMBODIMENTS

Figure 1:
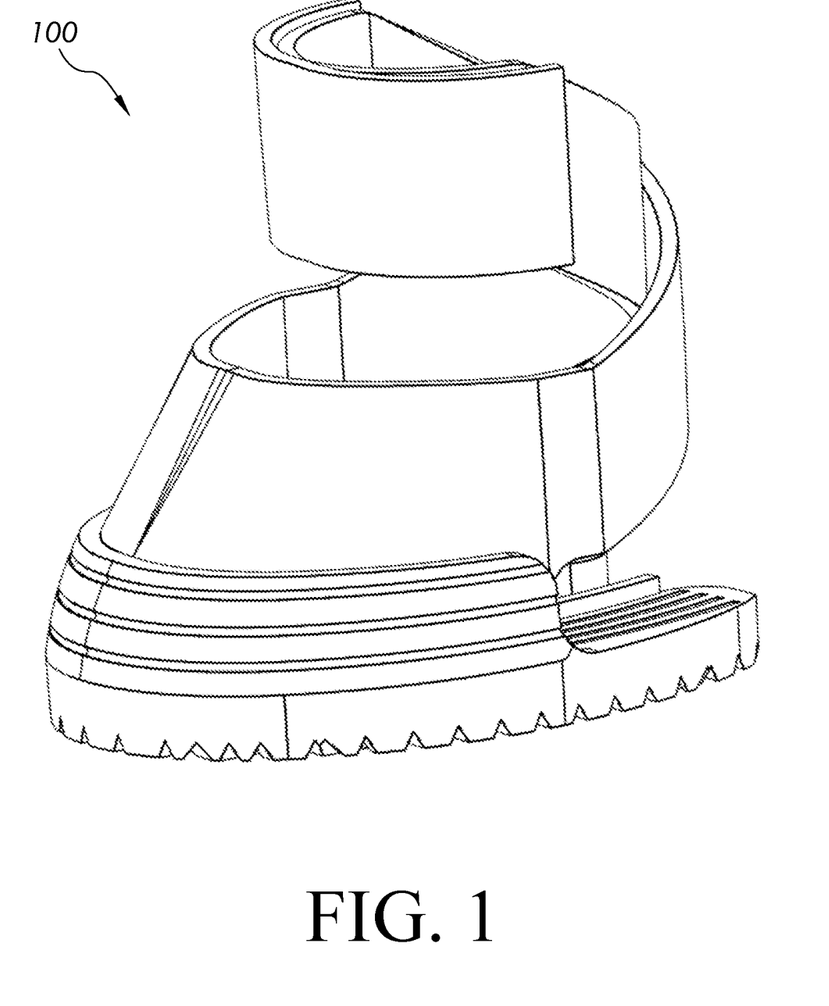
FIG. 1 is a perspective view of a first embodiment of a horse boot.

Referring now to the drawings, FIG. 1 depicts a perspective view of a first embodiment of a horse boot 100. The horse boot 100 provides a solution for horse owners that want to protect their horses from injury. In particular, the design is lightweight, durable, and is a cost-effective way to provide traction and support to horses that are either barefoot or wearing metal horseshoes. Additionally, as will be discussed further below, the boot 100 has an open-design and is readily installed/uninstalled with ease.

Figure 2:
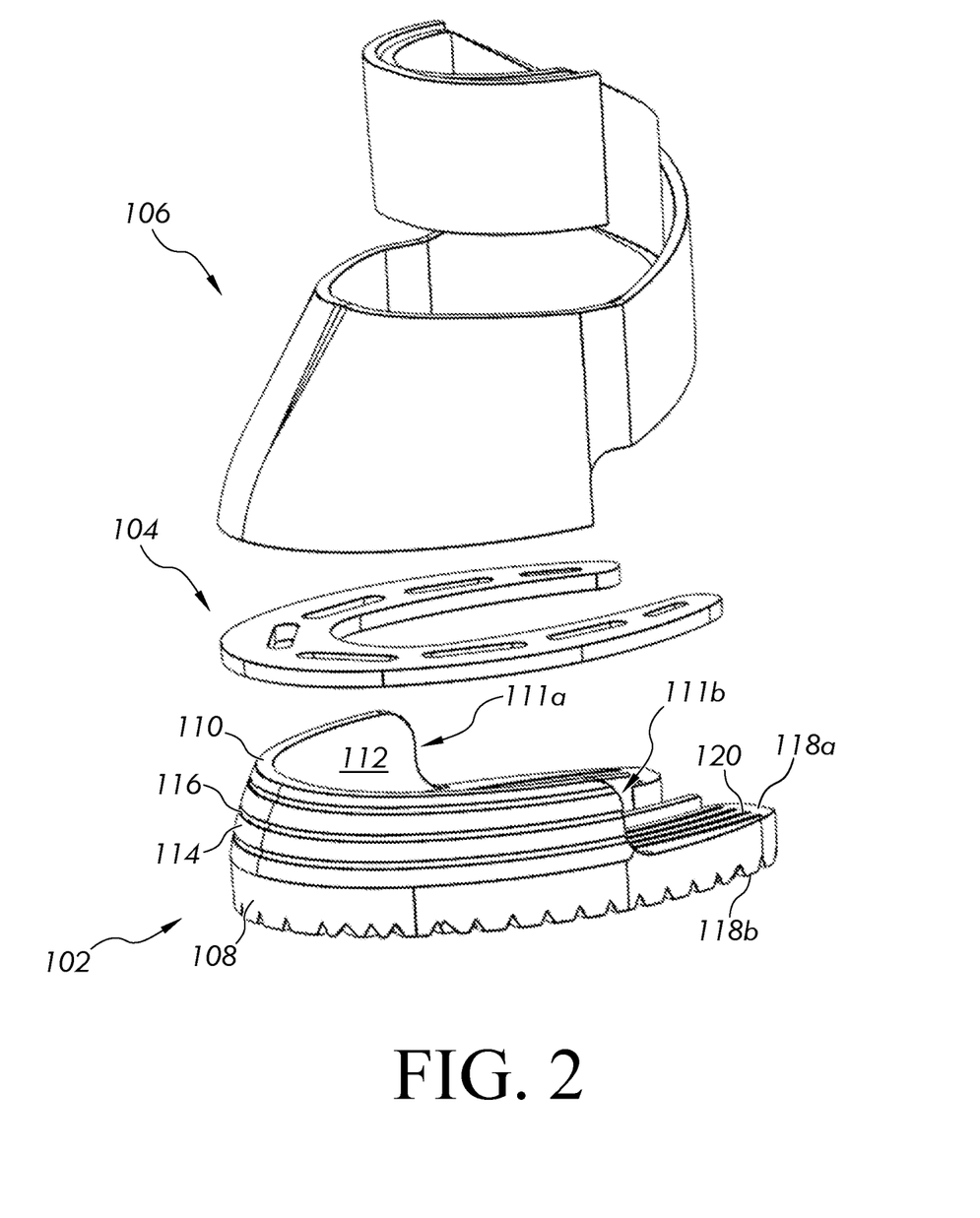
FIG. 2 is an exploded view of the horse boot shown in FIG. 1, including a sole, a plate, and an upper.

With reference to FIG. 2, the horse boot 100 is shown in an exploded view and includes a sole 102, a plate 104, and an upper 106. Notably, in an assembled state (e.g., as shown in FIG. 1), the plate 104 is fully embedded within the sole 102. However, the plate 104 is shown removed from the sole 102 in FIG. 2 for simplicity. The sole 102 may be manufactured via molding an elastomer material. For example, such materials may be natural or synthetic rubber, or any artificial elastomer. Notably, such synthetic rubbers may include styrene-butadiene rubbers (SBR), polyisoprene, chloroprene, nitrile rubber, butyl rubber, ethylene propylene rubber (EPR), silicone rubber, EPDM, thermoplastic elastomers, etc.

As shown, the sole 102 is shaped like a conventional horseshoe (i.e., U-shaped or substantially U-shaped) and includes a base 108 provided with an upstanding rim 110 at a front portion thereof. The rim 110 extends between lateral first and second edges 111a, 111b, and is curved so as to follow an outer periphery of the base 108. Further, the rim 110 is tapered inwards (i.e., in the vertical direction) so as to follow the general contour of a horse hoof. The rim 110 includes opposite internal and external surfaces 112, 114. The internal surface 112 is configured to face the horse hoof (when the hoof is inserted into the boot 100, as shown schematically in FIG. 10) and the external surface 114 is configured to face outwards and away from the hoof.

As further shown, a plurality of grooves 116 (i.e., depressions) are formed in the external surface 114 of the rim 110 and extend completely from the first edge 111a to the second edge 111b thereof. Moreover, the grooves 116 are shown in a stacked configuration (i.e., one vertically disposed above another). In the depicted example, three grooves 116 are formed in the external surface 114 of the rim 110. However, it is contemplated that the rim 110 may have fewer (e.g., only a single groove) or more grooves 116 formed therein. Additionally, it is contemplated that each groove 116 need not extend completely from the first edge 111a to the second edge 111b. Rather, at least one of said grooves 116 may extend between the first and second edges 111a, 111b without fully extending to said edges. Further still, said grooves 116 need not extend in a fully continuous manner. That is, each groove 116 can have a plurality of spaced sections extending between the first and second edges 111a, 111b of the rim 110.

Figure 5:
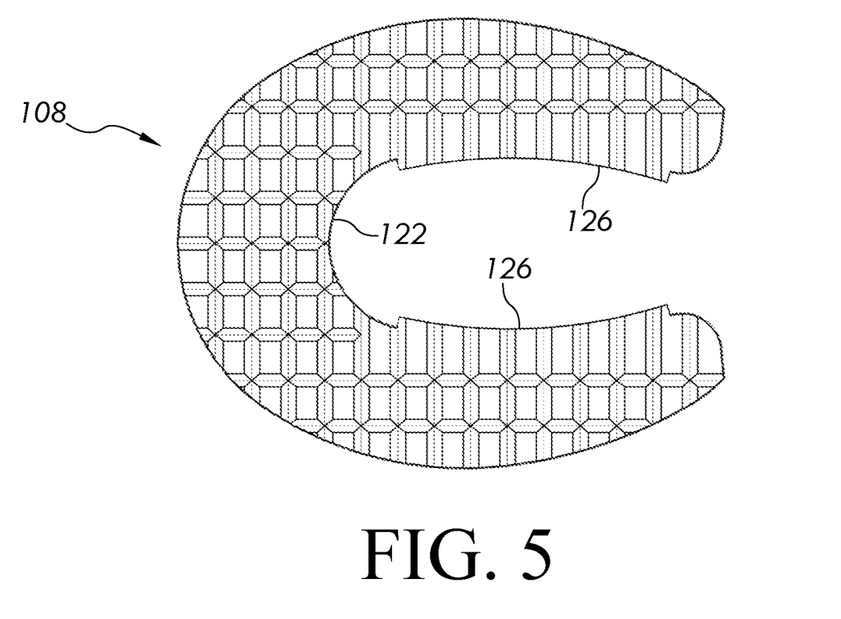
FIG. 5 is a bottom view of the sole shown in FIG. 2.
Figure 10:
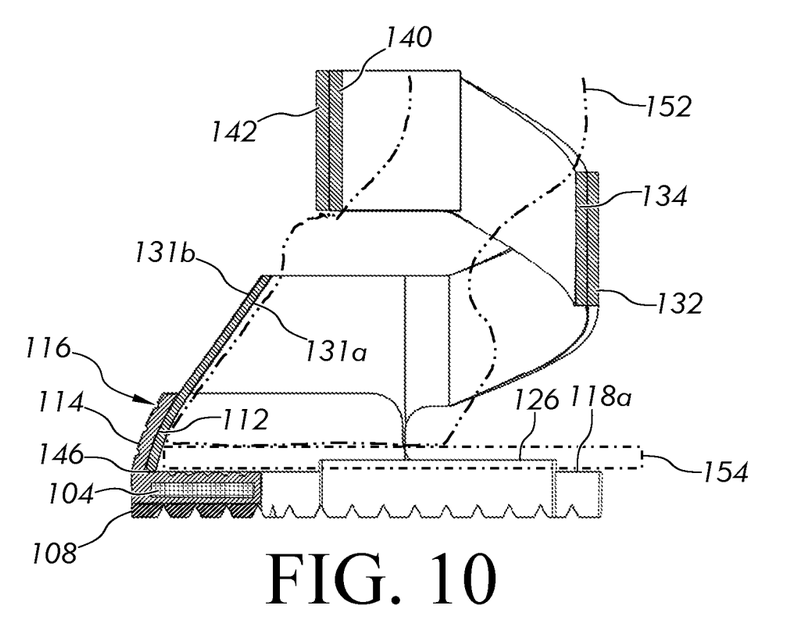
FIG. 10 is a cross-sectional view of the horse boot.

As further shown in FIG. 2, the base 108 has opposite, top and bottom engagement surfaces 118a, 118b. In an installed position (as shown in FIG. 10), the top surface 118a faces the horse hoof (and may directly contact a horseshoe attached thereto), whereas the bottom surface 118b faces outwards and away from the hoof. Notably, the bottom surface 118b has a depression pattern (i.e., tread) formed therein that is configured to provide smooth contact with the ground to enhance grip and stability. The depression pattern may be formed on an entirety of the bottom surface 118b (as shown in FIG. 5), or alternatively, only on select portions thereof. Additionally, the top surface 118a has a plurality of depressions 120 (e.g., grooves) formed therein that are configured to enhance engagement (i.e., traction) between the hoof (or a horseshoe attached thereto) and the sole 102.

Figure 3:
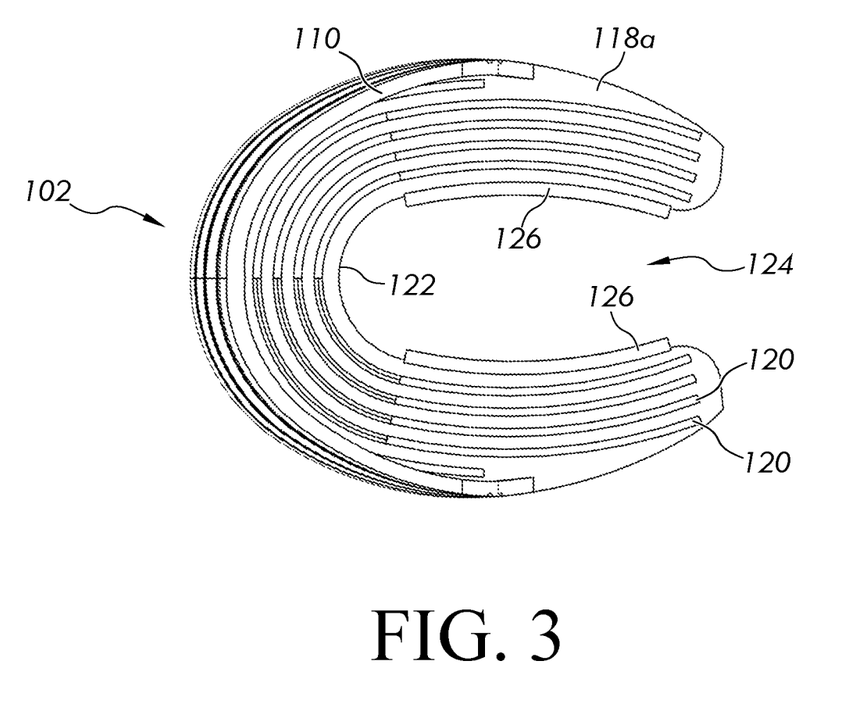
FIG. 3 is a top view of the sole shown in FIG. 2.
Figure 4:
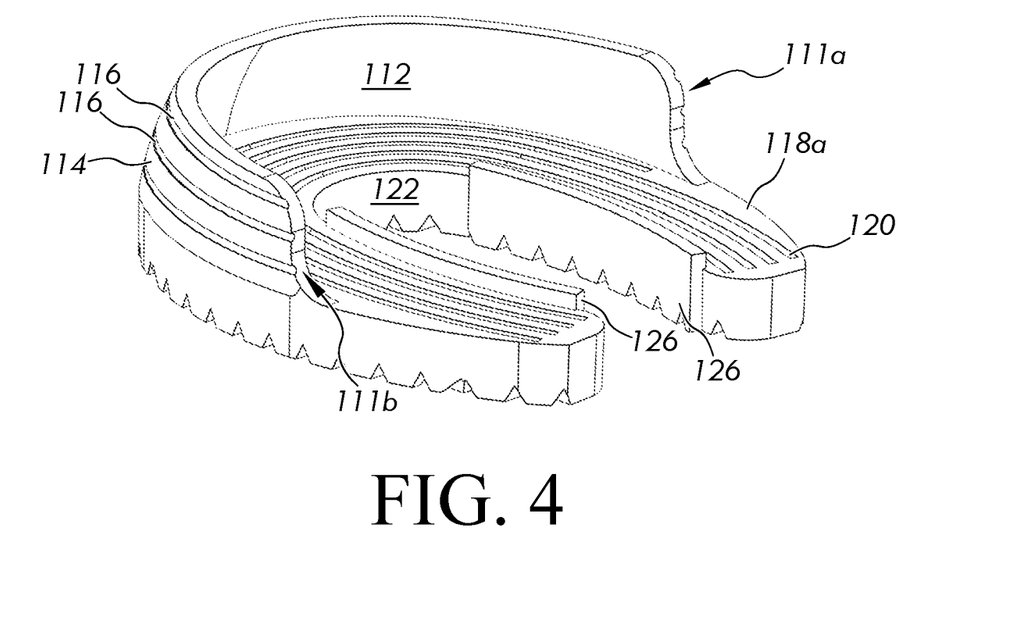
FIG. 4 is a perspective view of the sole shown in FIG. 2.

With respect to FIG. 3 and as briefly mentioned above, the sole 102 has a general horseshoe shape. More specifically, the base 108 of the sole has an inner peripheral surface 122 that defines an open-central area 124 of the base 108. Accordingly, the base 108 is U-shaped and is configured to accommodate a horse hoof (either shod or unshod) therein, as will be further discussed below. As further shown, the base 108 further includes a pair of protrusions 126 protruding outwards from the inner peripheral surface 122 thereof. As better shown in FIG. 4, the pair of protrusions 126 face one another and each said protrusion 126 protrudes outwards and away from the top surface 118a of the base 108. Notably, the illustrated example depicts the protrusions 126 as being separate and distinct from one another. However, it is also contemplated that a single, continuous protrusion can protrude outwards from the inner peripheral surface 122 and follow its contour (i.e., circumscribing the open-central area 124 of the base 108). Additionally, with respect to FIG. 5, respective bottom surfaces of the pair of protrusions 126 may be flush with the bottom surface 118b of the base 108 and likewise have the depression pattern formed therein.

Figure 6:
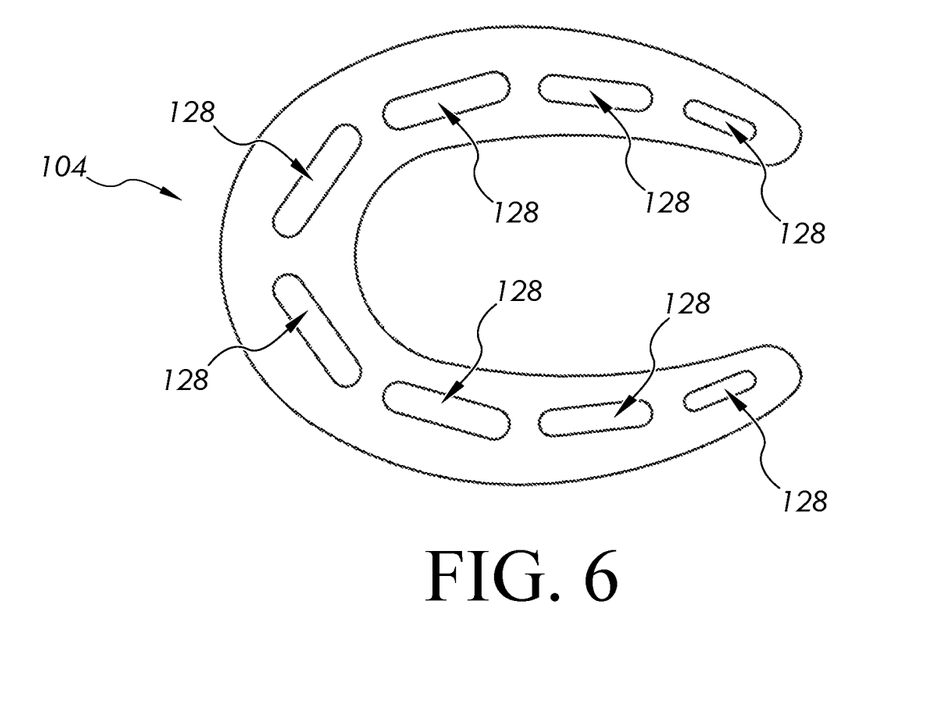
FIG. 6 is a top view of the plate sown in FIG. 2.

As mentioned above with respect to FIG. 2, the horse boot 100 likewise includes a plate 104. As best shown in FIG. 6, the plate 104, similar to the base 108, is likewise substantially U-shaped and has a plurality of apertures 128 (i.e., through-holes) formed therein. Notably, the apertures 128 are all separate and distinct from one another and are arranged to collectively follow the U-shaped design of the plate. That is, the longitudinal extent of each aperture 128 substantially matches an outer and/or an inner peripheral contour of the plate 104 at its respective location. In the depicted example, the plate 104 has a total of eight apertures 128 formed therein. It is contemplated that the plate 104 can have fewer than or greater than eight apertures. Moreover, it is contemplated that the plate 104 can have only a single aperture formed therein. For example, rather than a plurality of separate apertures 128, the plate 104 can have only a single, U-shaped aperture 128 formed therein. Notably, the plate 104 is metal (e.g., steel, aluminum, etc.) and is configured to evenly distribute forces across the boot 100, as will be explained further below. Alternatively, the plate 104 may be manufactured from a material other than metal (e.g., carbon fiber, etc.).

Figure 7:
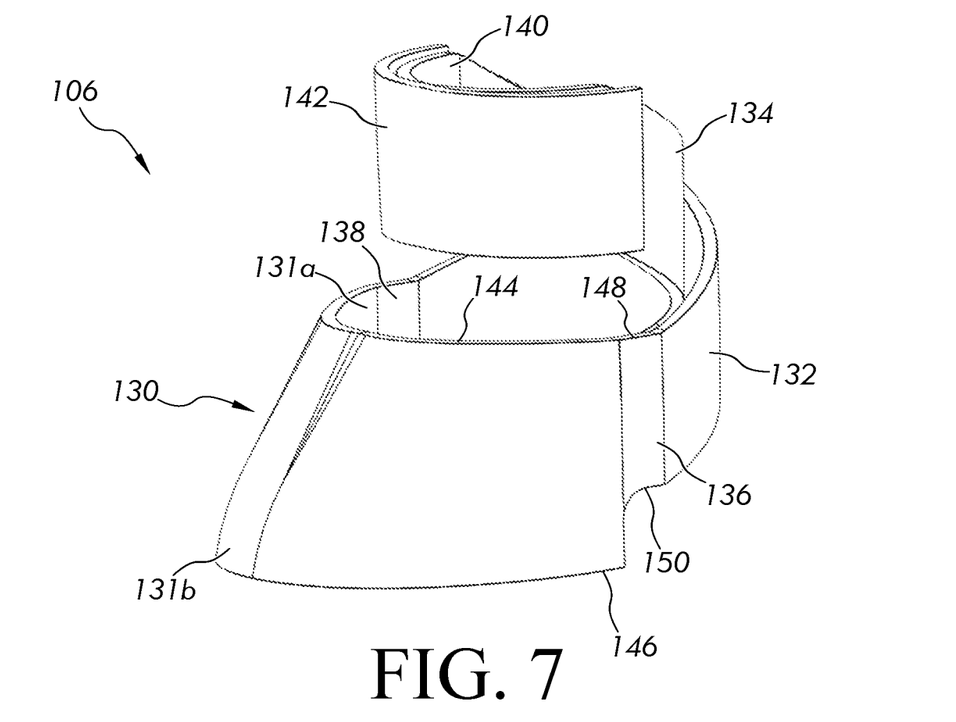
FIG. 7 is a perspective view of the upper shown in FIG. 2.

Now moving on to FIG. 7, the upper 106 is shown in a perspective view and includes a body 130 and a pair of straps (i.e., a first strap 132 and a second strap 134). Notably, the body 130 and the first and second straps 132, 134 are manufactured from fabrics (e.g., nylon, polyester, etc.) and are all formed integral with one another as a single piece part. However, it is contemplated that the first and/or second straps 132, 134 can be formed separate from the body 130 and subsequently secured/attached thereto (e.g., via sewing, etc.).

As depicted in FIG. 7, the body 130 has a general U-shape in cross-section and is configured to follow the contour of the rim 110, as will be explained further below. Moreover, the body 130 includes opposite internal and external faces 131a, 131b. The internal face 131a is configured to directly face the horse hoof (when the hoof is inserted into the boot 100) and the external face 131b is configured to face outwards and away from the hoof.

Each of the first and second straps 132, 134 extends outwards from the body 130 at a respective joint 136, 138 and terminates at a respective band 140, 142. As will be further explained below, the respective bands 140, 142 of the first and second straps 132, 134 are configured to be secured to one another via conventional fasteners (e.g., snaps, buckles, VELCRO® Brand fasteners such as hook and loop fasteners, etc.).

As further shown in the FIG. 7, the body 130 extends vertically from a top edge 144 to a bottom edge 146. Notably, a height of each joint 136, 138 is less than a distance spanning from the top edge 144 to the bottom edge 146 of the body 130. That is, each of the joints 136, 138 do not span an entire vertical distance of the body 130. Rather, in the depicted example, a top edge 148 of each joint 136, 138 sits flush with the top edge 144 of the body 130, and a bottom edge 150 of each joint 136, 138 is vertically spaced from the bottom edge 146 of the body 130. Notably, each of the first and second straps 132, 134 can have a distance between top and bottom edges thereof (e.g., as depicted in FIG. 7) that remains continuous between their respective joints 136, 138 and bands 140, 142. Alternatively, the first and/or second straps 132, 134 can have a corresponding distance that varies between their respective joints 136, 138 and bands 140, 142.

Manufacturing and assembly of the horse boot 100 will now be described. It is to be understood that the below manufacturing steps/processes are only one example of manufacturing the horse boot 100. Accordingly, it is contemplated that manufacturing/assembly of the horse boot 100 can be achieved via fewer or additional steps and/or with different manufacturing processes.

Figure 8:
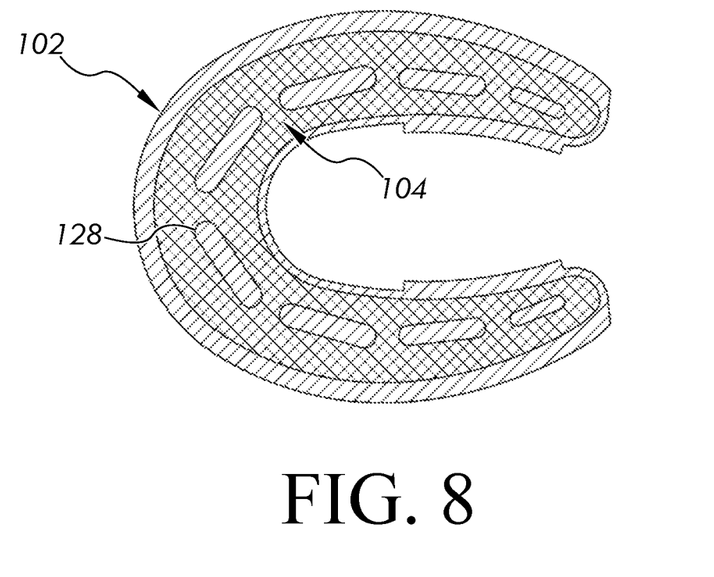
FIG. 8 is a cross-sectional view of the horse boot shown in FIG. 1.

First, the plate 104 is manufactured (e.g., via casting, stamping, forging, etc.). The plate 104 can be initially manufactured with the apertures 128 formed therein. Alternatively, the plate 104 can be manufactured as a single, solid piece, wherein the apertures 128 are subsequently formed therein (e.g., via drilling, punching, etc.). Next, the plate 104 is placed in a die and the sole 102 is produced via an injection molding process, wherein the sole 102 is over molded with respect to the plate 104. As shown in FIG. 8 (i.e., depicting a cross-sectional view of the boot 100 in FIG. 1), the plate 104 is completely embedded within the sole 102. That is, the plate 104 is fully encapsulated within the sole 102 such that none of its surfaces are exposed to the outside environment. Additionally, as shown in FIG. 8, during the injection process, the mold material flows into the apertures 128 and is subsequently hardened therein. Accordingly, after manufacturing of the sole 102, the material of the sole 102 resides within and completely fills the apertures 128 of the plate 104. This enhances the interconnection between sole 102 and the plate 104 and hinders lateral translation and/or rotational movement of the plate 104 with respect to the sole 102 when the boot 100 is in use. Moreover, prior to placing the plate 104 in the die, a chemical bond adhesive can be applied to the plate 104 (e.g., dipping, spraying, etc.) to facilitate the adhesion between the metal plate 104 and the rubber sole 102 for further enhanced connection therebetween.

Now moving on to FIG. 9, after the sole 102 has been manufactured, the upper 106 is provided and is subsequently attached to the sole 102. Specifically, the external face 131b of the body 130 is provided adjacent and brought into direct contact with the internal surface 112 of the rim 110 (e.g., as shown in FIG. 10). Additionally, the bottom edge 146 of the body 130 is provided adjacent and brought into direct contact with the top surface 118a of the base 108 (e.g., as shown in FIG. 10).

After the upper 106 has been correctly positioned with respect to the sole 102, the upper 106 is secured to the sole 102 via conventional means. In one example, the upper 106 can be secured to the sole 102 via stitching (not shown) provided in the plurality of grooves 116. In another example, the upper can be secured to the sole 102 via staples (not shown) provided in the plurality of grooves 116. In yet a further example, the upper 106 can be secured to the sole 102 via an adhesive (not shown) provided between the external face 131b of the body 130 and the internal surface 112 of the rim 110.

Figure 9:
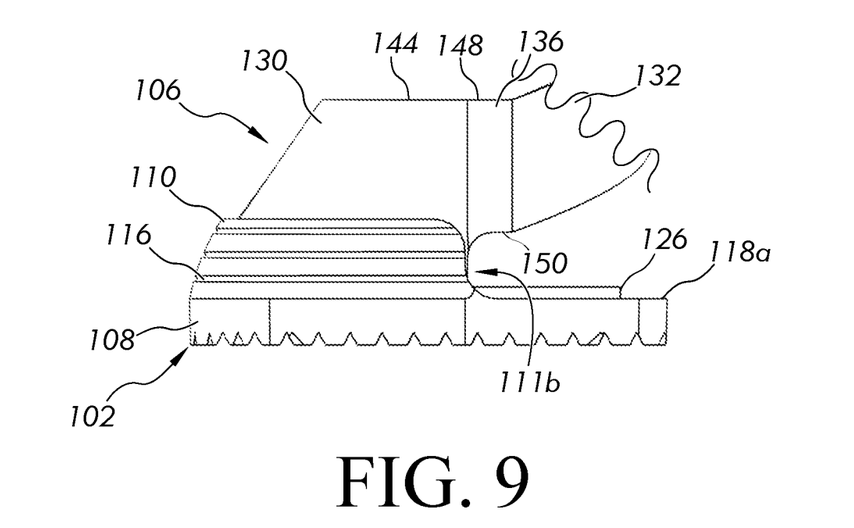
FIG. 9 is a partial side view of the horse boot shown in FIG. 1.

In the correctly assembled state (e.g., as shown in FIG. 9), the rim 110 projects further towards a rear end of the base 108 than the body 130 of the upper. That is, a spaced distance between the lateral first edge 111a (or the lateral second edge 111b) of the rim 110 and the rear end of the base 108 is smaller than a corresponding spaced distance between a rear edge of the body 130 and the rear end of the base 108. As further shown, the bottom edge 150 of the joint 136 (as well as the bottom edge 150 of the joint 138, not shown) is provided at a spaced distance from both the top surface 118a of the base 108 as well as the protrusion 126. As will be explained further below, these dimensions are important in order to provide an opened-back of the boot 100.

Now with reference to FIG. 10, schematic cross-sectional view of the boot 100 is shown in an installed position. Notably, the boot 100 depicted in FIG. 10 is shown installed on a shod horse. However, it is contemplated that the boot 100 can likewise function on an unshod horse. As shown, a horse hoof 152 is inserted into the boot 100, wherein a horseshoe 154 is attached to an under surface of the hoof 152 (e.g., via conventional means). The horseshoe 154 can be a conventional style horseshoe, or a particular shoe used in various equestrian applications. In the depicted example, the horseshoe 154 is a sliding plate. Sliding plates (also known as slide plates) are shoes attached on the back feet of reining horses to help them slide across the ground while they are in a sliding stop (e.g., during horse reining competitions). Sliding plates are typically wider and longer than traditional horseshoes and permit the horse to slide more easily while coming to a stop.

When the boot 100 is installed, the internal face 131a of the body 130 directly faces (and may contact) the hoof 152. Additionally, a bottom surface of the horseshoe 154 sits on and is in direct contact with the top surface 118a of the base 108. As further shown, each of the first and second straps 132, 134 wraps around a rear of the hoof 152 and travels helically upward wherein their respective bands 140, 142 meet one another at a front of the hoof 152 and are secured together as mentioned above. The above-mentioned helical path of each of the first and second straps 132, 134 provides an overall crossing pattern that fully secures the boot 100 to the hoof 152 (when the bands 140, 142 are secured to one another).

As can further be seen, the overall dimensioning and positioning of the first and second straps 132, 134, their respective joints 136, 138 and the body 130 with respect to the sole 102 (and more particularly, the rim 110) provides the boot 100 with an opened back design (i.e., an opened backing), that permits the horseshoe 154 (i.e., the sliding plate) to extend out of the boot 100. If the boot 100 had a conventional design (i.e., where the hoof is fully enclosed), then the horseshoe 154 would need to be removed prior to installing the boot 100. Notably, in the installed position, the horseshoe 154 is laterally trapped between the rim 110 as well as the protrusions 126. That is, the protrusions 126 help to easily locate the horseshoe 154 during installation, as well as provide enhanced lateral stability when the horse is walking about. However, the protrusions 126 are not overly restrictive. That is, the above-noted boot 100 allows for a nominal degree of rotation. Specifically, the boot 100 does not place significant lateral stress on the hoof 152 or the horse's joints. Rather, the boot 100 is configured to allow for rotation from side to side as the horse walks.

In short, the aforementioned boot 100 provides rigid support under the horse's hoof 152. Specifically, the metal plate 104 hinders concentrated shear or compressive forces that could be applied to the bottom of the hoof 152 by stepping on an uneven surface, such as a rock. That is, the metal plate 104 evenly distributes resulting forces across the entire surface of the sole 102 (e.g., at the base 108), reducing the likelihood of an associated injury to the hoof 152. The thickness of the portion of the base 108 below the plate 104 provides padding and energy absorption enhancing the comfort of the horse, while also permitting the inclusion of a tread pattern. The thickness of the portion of the base 108 above the plate 104 provides a gripping surface, preventing potential metal on metal contact (i.e., between the plate 104 and the horseshoe 154). Additionally, the U-shaped, open bottom design of the base 108 enables a majority of the bottom of the horse hoof anatomy to remain open to airflow and the elements. As such, the hoof 152 is kept in as natural of an environment as possible.

Figure 11:
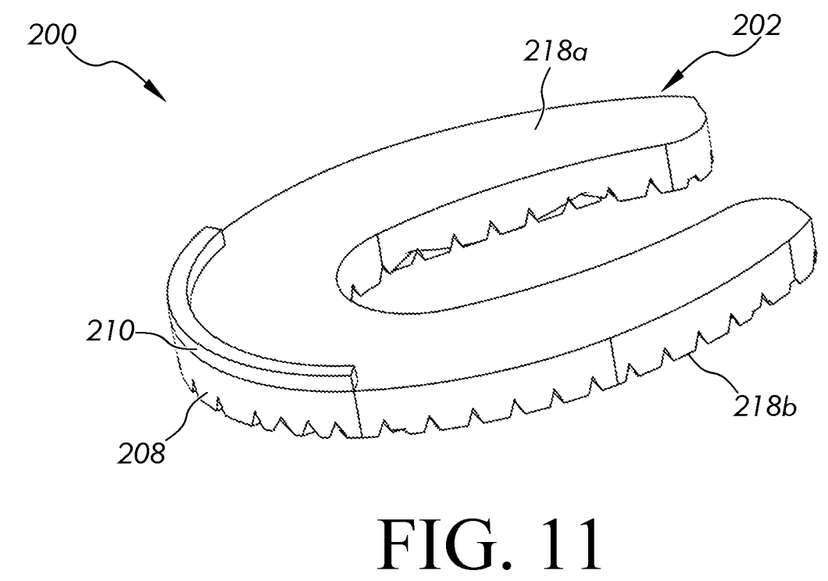
FIG. 11 is a perspective view of a second embodiment of a horse boot.

Now moving on to FIG. 11, a second example of a horse boot 200 is shown. The second example of the horse boot 200 shares similarities with the first example of the horse boot 100, discussed above. For brevity, those similarities will not be discussed in detail here. Additionally, similar reference numerals will be used (where applicable) to denote the same or similar parts/features.

Figure 16:
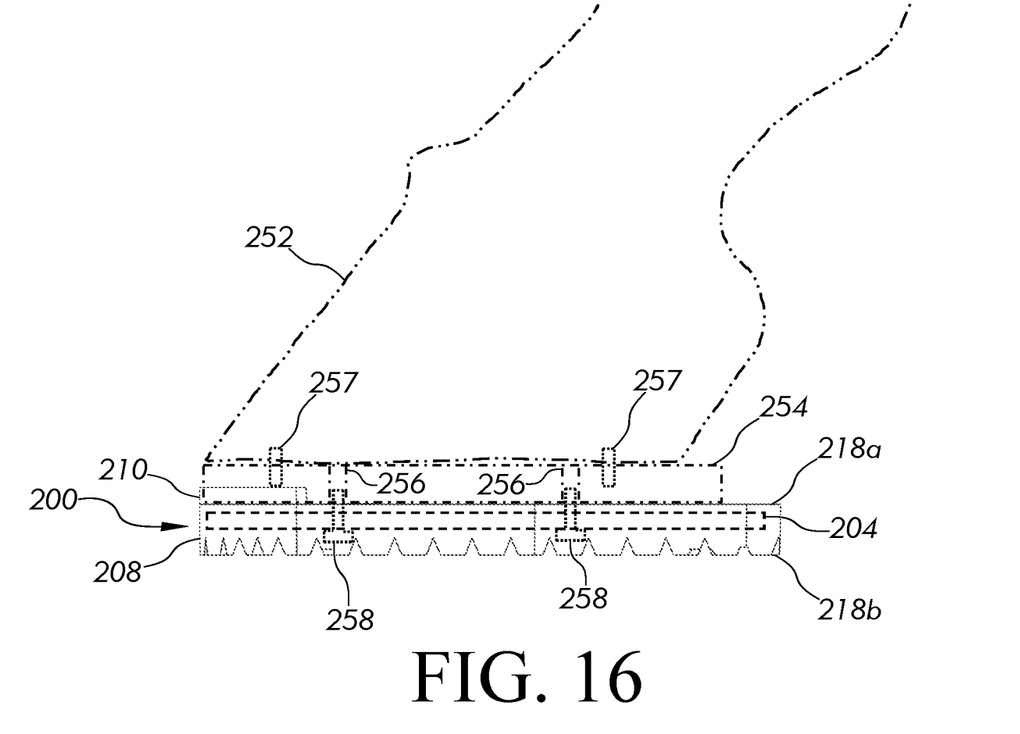
FIG. 16 is a schematic view of a horse boot installed on a horse hoof.

As shown in FIG. 11, the boot 200 includes a sole 202 having a U-shaped base 208, wherein a rim 210 stands proud from the base 208 at a front-most portion thereof. The base 208 is provided with top and bottom surfaces 218a, 218b, wherein the top surface 218a is configured to face and directly contact a horseshoe 254 (as shown in FIG. 16, discussed below), and wherein the bottom surface 218b is configured to face outwards and away from the horseshoe 254. Additionally, the bottom surface 218b has a depression pattern (i.e., tread) formed therein that is configured to provide smooth contact with the ground in order to enhance grip and stability.

Figure 12:
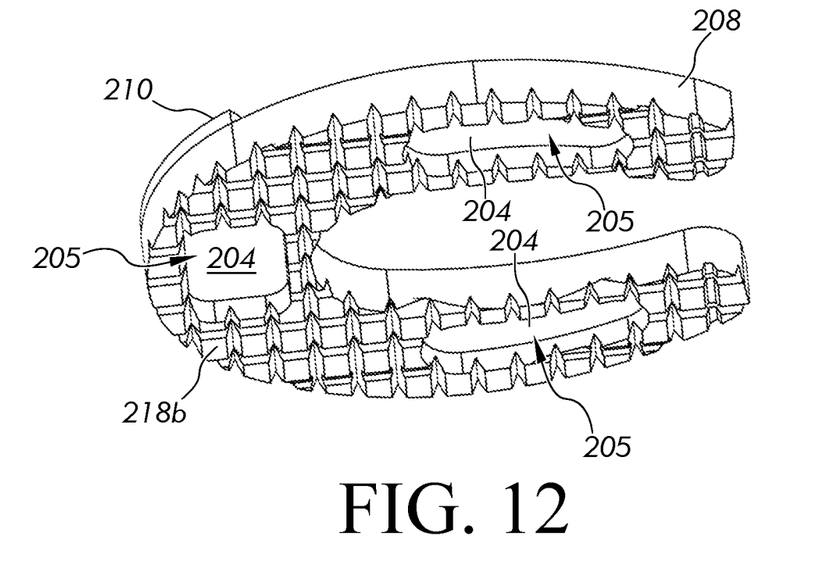
FIG. 12 is another perspective view of the horse boot shown in FIG. 11.
Figure 13:
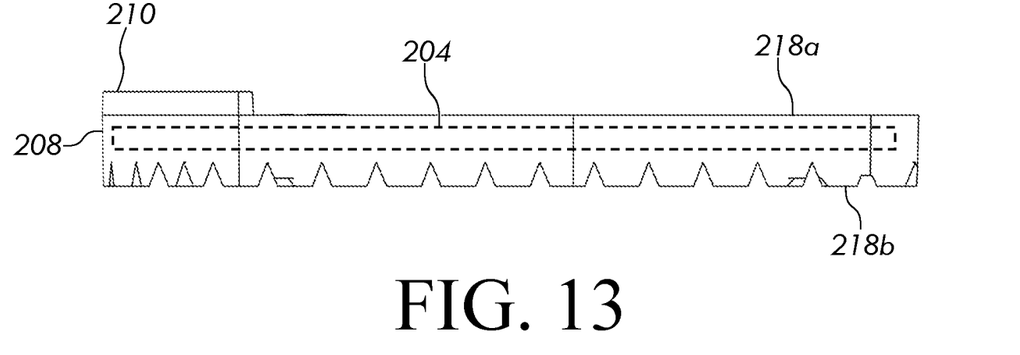
FIG. 13 is a side view of the horse boot shown in FIG. 11.
Figure 14:
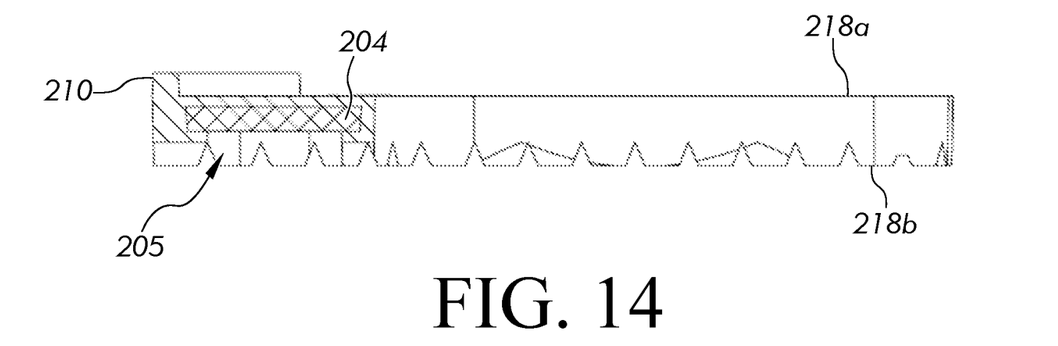
FIG. 14 is a cross-sectional view of the horse boot shown in FIG. 11.

With respect to FIG. 12, the boot 200 further includes a plate 204 (e.g., a metal plate) that is embedded therein. Notably, in contrast to the first embodiment of the horse boot 100, the plate 204 here is not fully encapsulated within the sole 202. Specifically, as schematically shown in FIG. 13, the top and peripheral surfaces of the plate 204 are fully covered by the sole 202. However, as shown in FIGS. 12 and 14, select portions of the bottom surface of the plate 204 are exposed via corresponding cutouts 205 (i.e., apertures, etc.) provided in the bottom surface 218b of the base 208.

As shown in FIG. 12, the bottom surface 218b of the base 208 has a total of three cutouts 205 provided therein to expose three sections or areas of the bottom surface of the plate 204. However, it is contemplated that the number of cutouts 205 need not be three. That is, the base 208 may have a fewer or greater number of cutouts 205.

Figure 15:
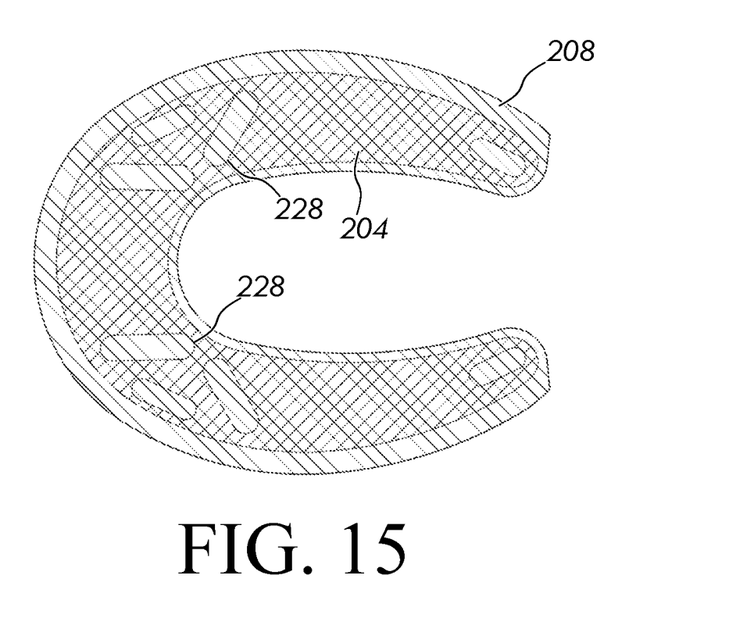
FIG. 15 is a cross-sectional view of the horse boot shown in FIG. 11.

With reference to FIG. 15, the plate 204 includes a plurality of apertures 228 (i.e., through-holes) formed therein. Notably, the apertures 228 formed in the plate do not align with and/or overlap the cutouts 205 (e.g., in vertical cross-section). Additionally, after manufacturing, the material of the sole 202 resides within and completely fills the apertures 228 of the plate 204, to enhance the interconnection therebetween, as discussed above. Again, prior to placing the plate 204 in the die, a chemical bond adhesive can be applied to the plate 204 to facilitate the adhesion between the metal plate 204 and the rubber sole 202 for further enhanced connection therebetween. In this embodiment of the boot 200, the chemical bond adhesive also hinders corrosion of the exposed surfaces of the plate 204.

Now with reference to FIG. 16 (depicting a schematic side view of the boot 200 in an installed position), a method of installing the boot 200 will now be discussed. It is to be understood that the below method steps are only one example of assembly. Accordingly, it is contemplated that fewer or additional steps may be used to install the boot 200, and that the below noted method steps need not occur in the specified order.

First, a horseshoe 254 (e.g., a sliding plate) is provided and is drilled and tapped to provide threaded holes 256 therein at predefined positions. For simplicity, a template (not shown) may be provided that corresponds to the particular type/size of horseshoe, depicting the desired drilling locations. Notably, the example illustrates the threaded holes 256 as being through-holes (i.e., completely extending from one surface to an opposing surface). However, it is contemplated that the threaded holes 256 could likewise be formed as blind-holes, or any other type of hole.

After the threaded holes 256 in the horseshoe 254 have been formed, the boot 200 is provided and aligned with the horseshoe 254 in an overlapping manner in order to determine corresponding mating locations in the boot 200. For simplicity, the boot 200 and the horseshoe 254 can be clamped together in order to ensure that correct alignment between the boot 200 and the horseshoe 254 remains during the process of determining the corresponding mating locations. Notably, the horseshoe 254 and the boot 200 can be aligned such that a planar surface of the horseshoe 254 is disposed on the top surface 218a of the base 208. In this manner, markings can be made on the top surface 218a (i.e., rubber flashing) that identify drilling locations that perfectly align with their corresponding threaded holes 256 formed in the horseshoe 254. Alternatively, the horseshoe 254 and the boot 200 can be aligned such that a planar surface of the horseshoe 254 is disposed on the bottom surface 218b of the base 208. Accordingly, in this example, such markings can be made directly on the exposed surfaces of the plate 204, defined by the respective cutouts 205 in the bottom surface 218b. In either case, a drilling operation is subsequently performed at the marked locations in order to form respective through-holes therein (e.g., either threaded or unthreaded through-holes).

Next, the horseshoe 254 is secured to the hoof 252 via conventional means, such as nails 257. Thereafter, the boot 200 is arranged underneath the horseshoe 254. Notably, an inner face of the rim 210 directly faces (and physically contacts) an external, peripheral surface of the horseshoe 254. Additionally, the top surface 218a of the base 208 directly faces (and physically contacts) a bottom surface of the horseshoe 254. Subsequently, fasteners 258 (e.g., screws) are used to secure the boot 200 to the horseshoe 254. More specifically, as shown in FIG. 16, a shank of the fastener 258 extends through the plate 204 as well as the base 208 (i.e., the material of the base 208 above the plate 204) and is received in a corresponding one of the threaded holes 256 and is secured thereto via a threaded engagement. Further, in the installed position, a head of the fastener 258 is provided in direct contact with a bottom surface of the plate 204. Notably, an entirety of the shank may be threaded, or alternatively, only a portion of the shank may be threaded (e.g., at its end opposite the head). Further, a vertical dimension (i.e., height) of the head is smaller than a vertical dimension of the cutout 205. As such, the head of the fastener 258 is fully received within the cutout 205 when correctly installed. That is, no portion of the fastener 258 (e.g., its head) extends outwards and beyond the bottom surface 218b of the base 208 when installed.

In one alternative to the above-noted method, the boot 200 may have full or partial apertures (i.e., through-holes) pre-formed in the plate 204 and/or in the material of the base 208 thereabove that correctly align with the threaded holes 256 formed in the plate 204. Such pre-formed apertures may match (i.e., align) with the above-noted template. In another alternative example, the boot 200 may be provided with pre-formed markings on the exposed surface of the plate 204. Accordingly, the fastener 258 can be a self-tapping fastener, wherein the markings designate a correct insertion point so that the fastener 258 will correctly engage with the threaded holes 256.

Figure 17:
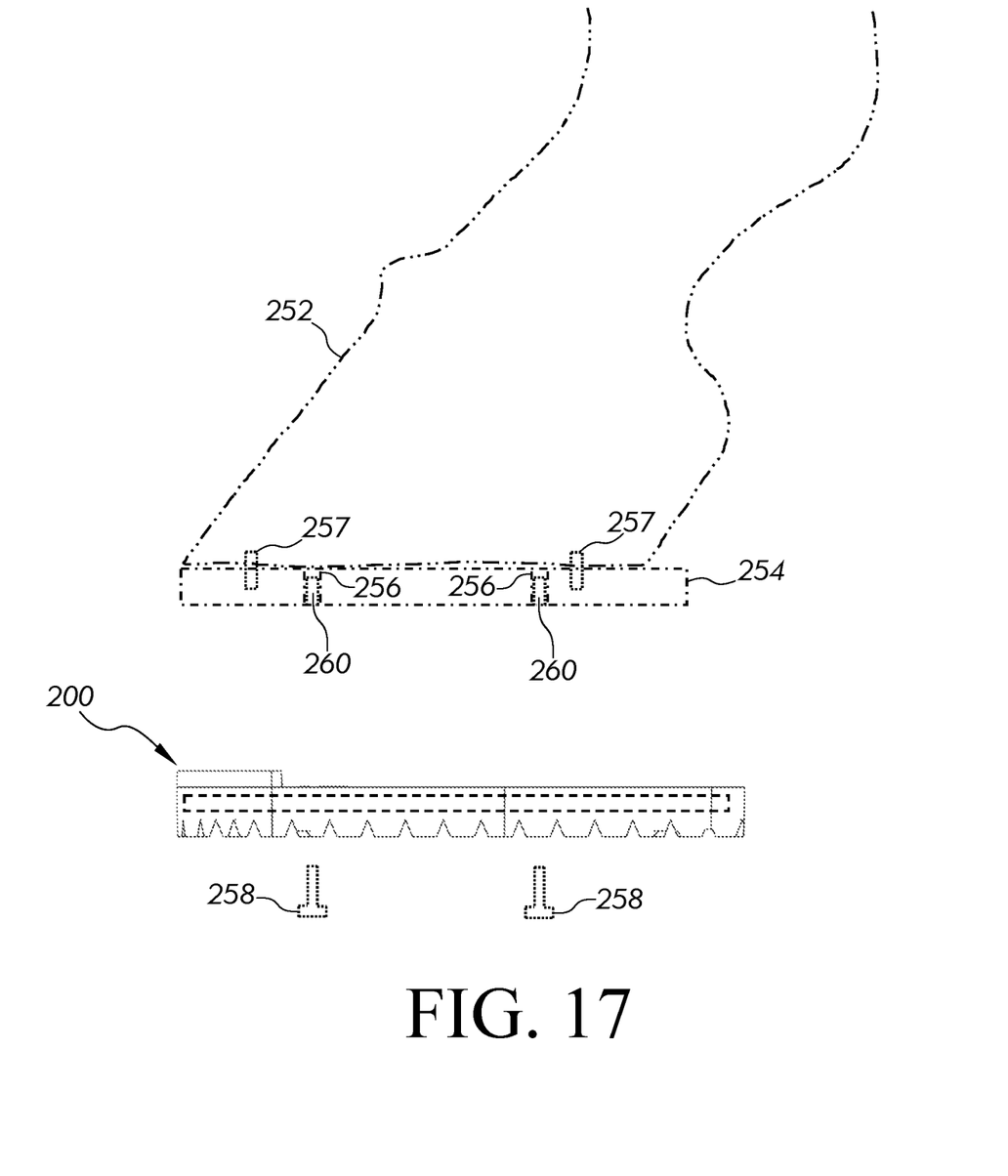
FIG. 17 is a schematic view of the horse boot removed from the horse hoof.

With reference to FIG. 17, to uninstall the boot 200, one only needs to remove the fasteners 258. That is, after the fasteners 258 are removed, the boot 200 is readily movable such that it can be pulled away from the horseshoe 254 (which still remains attached to the hoof 252). Thereafter, other fasteners 260 (e.g., plugs, caps, set screws, etc.) can be received in the threaded holes 256 in order to prevent debris (dirt, etc.) from entering those holes 256 and becoming entrapped therein. Notably, bonding, locking and/or sealing adhesives may be provided on the fasteners 258, 260 to enhance the threaded connection and prevent the fastener from accidental disengagement overtime.

The second embodiment of the boot 200 provides the same technical advantages noted above with respect to the first embodiment of the boot 100. That is, the boot 200 provides the same force distribution (e.g., via the metal plate 204), comfort, and stability as noted above.

In either embodiment, the boot is removably securable to the hoof in an efficient and secure manner. The overall design of the boot keeps the hoof in as natural of an environment as possible, while also permitting installation on shod horses wearing various sized horseshoes (e.g., sliding plates). As such, if a horse is being transported from a stable or trailer to a reining event (or any other type of event), the boots can quickly be installed on all four of the hooves to prevent injury (e.g., resulting from a slip/fall) during the walk to the event. The boots are particularly useful in wet conditions, and even more so when walking on wet, synthetic surfaces. After reaching the destination, the boots can be quickly removed and stored for later use.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. A method of removably installing a horse boot, the method comprising the steps of:
   providing a horse having a horseshoe attached to a hoof thereof;
   providing a horse boot comprising:
   a sole having opposite first and second engagement surfaces; and
   a plate embedded within said sole between said first and second engagement surfaces,
   wherein said sole is horseshoe shaped and has an open-central area configured to permit a bottom of the hoof to remain open to airflow;
   placing the horse boot adjacent the hoof such that the first engagement surface of the sole contacts the horseshoe; and
   attaching the horse boot to the horseshoe via a first fastener.

2. The method of claim 1, wherein said step of attaching the horse boot to the horseshoe comprises passing a first end of the first fastener through the sole and the plate and securing said first end of the first fastener within a threaded hole formed in the horseshoe via a threaded engagement.

3. The method of claim 2, wherein said horse boot further comprises a cutout formed in the second engagement surface of the sole, wherein when the horse boot is attached to the horseshoe, a second end of the first fastener, opposite to the first end, is disposed within the cutout such that said first fastener does not extend beyond the second engagement surface of the sole.

4. The method of claim 3, wherein said cutout exposes a portion of a surface of the plate, wherein said first fastener comprises a head provided at the second end thereof, and wherein the head physically contacts the surface of the plate when the horse boot is attached to the horseshoe.

5. The method of claim 2, further comprising:
   removing said first end of the first fastener from said threaded hole;
   separating the first engagement surface of the sole from the horseshoe;
   providing a second fastener; and
   securing said second fastener within the threaded hole.

* * * * *